United States Patent Office 2,709,714
Patented May 31, 1955

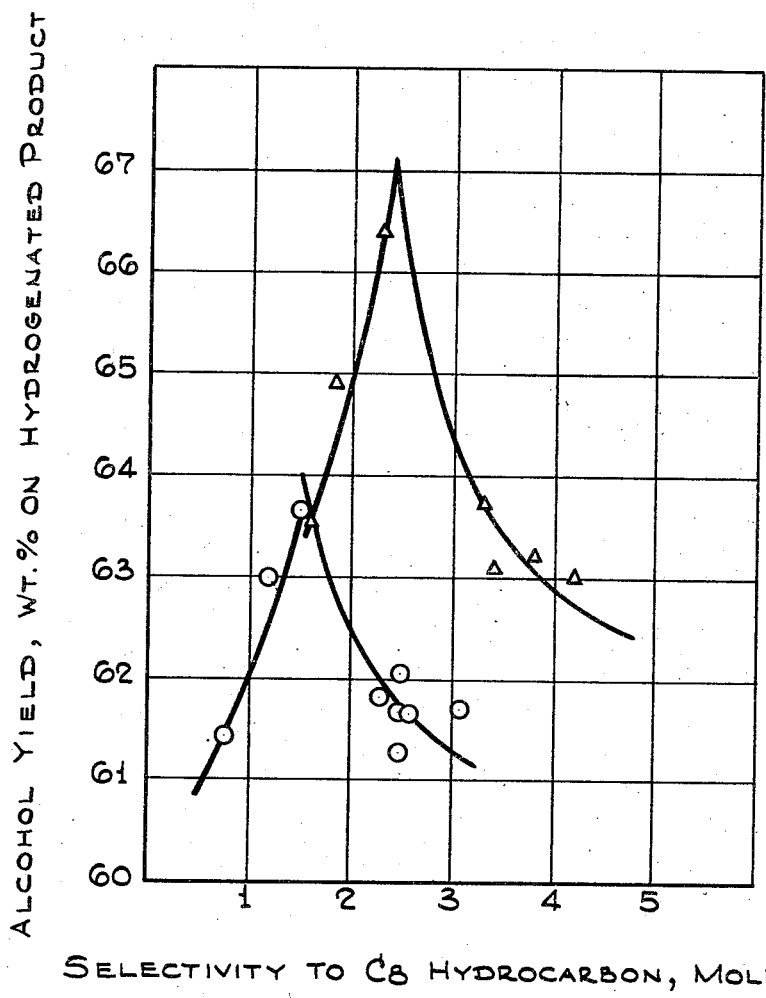

2,709,714

PRODUCTION OF OXO ALCOHOLS

Joseph K. Mertzweiller, Baton Rouge, La., assignor to Esso Research and Engineering Company, a corporation of Delaware Application April 19, 1951, Serial No. 221,830

5 Claims. (Cl. 260—638)

The present invention relates to the production of alcohols by reacting organic olefinic compounds with gas mixtures containing CO and $H_2$ at high pressures and elevated temperatures in the presence of a carbonylation catalyst to produce aldehydes, and thereafter hydrogenating said aldehydes to the corresponding alcohols. More especially, the invention is concerned with an improved process for increasing the alcohol yields in said hydrogenation stage.

The synthesis of aldehydes from olefins and mixtures of CO and $H_2$ is now well known in the art. The olefinic starting material is reacted in the liquid state with CO and $H_2$ in the presence of an iron group catalyst, preferably cobalt. The primary reaction product consists essentially of organic carbonyl compounds, mainly aldehydes, having one more carbon atom per molecule than the olefinic feed. The oxygenated product is then hydrogenated in a second catalytic stage to convert the aldehydes to the corresponding alcohols.

Suggested as starting materials have been practically all types of organic compounds having olefinic double bonds, including aliphatic olefins and di-olefins, cycloolefins, aromatics with olefinic side chains, olefinic oxygenated compounds, and the like. The metal may be present as a solid or in the form of a compound soluble in the olefinic feed stock. Suitable reaction conditions include temperatures of about 150°–450° F., pressures of 100–300 atmospheres, $H_2$/CO ratios of 0.5–2:1, liquid feed rates of about 0.1 to 5.0 v./v./hr., and gas feed rates of about 1000–45,000 cubic feet per barrel of liquid olefin feed.

After the aldehyde synthesis is completed, the reaction product, usually containing large amounts of catalyst, such as cobalt carbonyl in solution, is given a thermal treatment in the presence of hydrogen, or is chemically treated to remove catalyst. Thereafter, the aldehyde product is hydrogenated at temperatures and pressures of the same order of magnitude as those existing in the carbonylation zone in the presence of hydrogenation catalyst to produce alcohols, and it is to this stage of the operation that the present invention appertains.

In the past, serious difficulties have been encountered in the hydrogenation stage when sulfur-sensitive catalysts such as nickel, are employed. Nickel catalysts are exceptionally active, even at moderate temperatures of 300°–400° F., and form good quality alcohol with very low carbonyl number and sulfur content. However, the most readily available olefinic feed stocks for the alcohol synthesis reaction usualy have fairly high sulfur content. This sulfur is carried through the aldehyde synthesis stage to the hydrogenation stage, where it combines with the hydrogenation catalyst to reduce its activity and eventually renders it useless. Nickel catalyst poisoned by sulfur is not readily nor totally regenerable.

An excellent catalyst for the hydrogenation of the aldehyde product has been found to be the sulfactive catalyst molybdenum sulfide, preferably supported on an activated carbon support. Though not quite as active as nickel and the sulfur-sensitive catalysts, it is of high mechanical strength, which is of particular importance in commercial operation which involves the use of fixed catalyst beds of considerable height and weight to which the lower catalyst layers are subjected. Furthermore, not only is the catalyst not poisoned by sulfur nor weakened by water, but also it is insensitive to carbon monoxide; inasmuch as the gas and liquid streams involved in the synthesis of alcohols from olefins contain more or less CO, the presence of this gas would poison such hydrogenation catalysts as cobalt or nickel which form carbonyls.

Desirable as it is to employ the sulfactive catalyst of the molybdenum sulfide-activated carbon type, its use gives rise to problems, the solution of which are the basis of the present invention. Catalyst activity in organic carbonyl hydrogenation systems is generally expressed in terms of the extent of reduction of carbonyl groups to hydroxyl groups for the same reaction conditions and feed stocks; a zero carbonyl number indicates with a nickel hydrogenation catalyst that the aldehyde or ketone is completely converted to alcohol. When, however, it is attempted to obtain the same degree of carbonyl reduction with a molybdenum sulfide catalyst as that obtained by a nickel catalyst, it is found that a definitely higher temperature, of the order of about 450° to 550° F. was necessary, when hydrogenating an iso-octyl aldehyde prepared by reaction of a heptene fraction with CO and $H_2$ in the presence of cobalt. The hydrogenation product thus obtained, however, instead of having a hydroxyl number corresponding to that obtained with the nickel catalyst, contained substantially less alcohol than the corresponding nickel-treated product, although the carbonyl numbers were essentially equal.

It has now been found that molybdenum sulfide hydrogenation catalyst, supported on charcoal, has the property, unique among hydrogenating agents and catalysts, of catalyzing acetalization of the alcohol product with unreacted aldehyde product to form acetals. The acetals formed are in turn hydrogenated under the conditions existing in the hydrogenation zone; there exists then an "acetal equilibrium" within the hydrogenation zone, dependent upon the specific conditions therein. The reactions involved in this equilibrium are illustrated by the following equations:

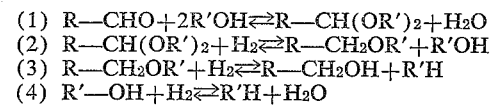

(1) $R\text{—CHO} + 2R'OH \rightleftarrows R\text{—CH}(OR')_2 + H_2O$
(2) $R\text{—CH}(OR')_2 + H_2 \rightleftarrows R\text{—CH}_2OR' + R'OH$
(3) $R\text{—CH}_2OR' + H_2 \rightleftarrows R\text{—CH}_2OH + R'H$
(4) $R'\text{—OH} + H_2 \rightleftarrows R'H + H_2O$ Thus, for each mol of acetal decomposed by hydrogenolysis there is formed a mol of hydrocarbon containing the same number of carbon atoms as the original carbonyl compounds. It has also now been found that higher hydrogenation temperatures favor the hydrogenolysis of the acetals and the ethers, so that there is a general tendency to increase the alcohol yield by increasing the hydrogenation temperature. On the other hand, this tendency is offset and opposed by the loss of alcohols at the higher temperatures by over-hydrogenation, in accordance with Equation 4. Accordingly, it is necessary to have an entirely different criterion of catalyst activity when operating with a sulfactive catalyst of the molybdenum sulfide-on-charcoal type than when employing an active but sulfur-sensitive catalyst such as nickel. When operating a commercial plant with the latter, it is merely necessary to determine that all the aldehyde has been hydrogenated to know that the optimum yield of alcohol has been obtained. Over-hydrogenation has to be avoided here also, but this may readily be done by maintaining reaction conditions mild enough such that a zero carbonyl number is obtained under conditions predetermined not to be conducive to over-hydrogenation. However, with the MoS$_2$ catalyst, a zero carbonyl number may mean merely that there is no more aldehyde present; the alcohol content, however, may be at a lower level than it had been at a higher carbonyl value, because of this acetalization property of this catalyst, and the hydrogenation of the acetals at least in part to hydrocarbons.

It has now been found that the yield of carbonylation alcohol is a function, at a given conversion level of the olefin feed, of the hydrocarbon having the same number of carbon atoms as the desired alcohol (i. e. one more carbon atom than the parent olefin). More precisely, it has now been found, that at a critical value of the hydrocarbon content of the hydrogenation product, the yield of product alcohol is maximum for a given olefin conversion level. Small increases or decreases in the hydrocarbon content is accompanied by precipitous drop in the alcohol selectivity.

It is, therefore, the principal purpose of the present invention to hydrogenate efficiently, aldehydes produced by the olefin carbonylation reaction over a sulfactive, acetal promoting hydrogenation catalyst.

It is a more specific purpose of the present invention to hydrogenate effectively iso-octyl aldehyde produced by carbonylating a heptene fraction over a hydrogenation catalyst consisting of a 10% molybdenum sulfide-on-charcoal catalyst and obtain the maximum amount of alcohol.

Other and further objects and advantages of the present invention will appear hereinafter.

It has now been found that the hydrogenation of iso-octyl aldehyde to iso-octyl alcohol must be, for highest efficiencies, controlled by operating the plant responsive to the formation of octanes. As a result of numerous correlations, it has been found that for any given conversion level of heptene to iso-octyl aldehyde in the carbonylation zone, there is a critical value, in the hydrogenation zone, of octane formation. This value, which increases with the aldehyde zone conversion level, is quite precise. Small variations in either direction are accompanied by sharp drops in the alcohol yields.

In accordance with the present invention, therefore, a hydrogenation plant employing the above-described catalyst is operated responsive to the octane content of the hydrogenated product.

The hydrogenation reaction may be carried out at temperatures of about 450° to 550° F. and at pressures of about 2000 to 4000 p. s. i. g., preferably at about 480° to 520° F. and 2500 to 3500 p. s. i. g. A liquid feed rate of about 0.5 to 1.5 v./v./hr. is preferably employed. It is also desirable to add about 1–10% of water to the hydrogenation zone. In accordance with the present invention, the reaction conditions are controlled responsive to the octane content of the product. Thus, as will be made more clear hereinafter, when the conversion level of the olefin within the aldehyde synthesis zone is within the range of about 74–76%, the selectivity to octane in the hydrogenation zone must not be allowed to be greater nor less than about 1.5 mol %; when the conversion level in the aldehyde synthesis step is about 79–81%, the octane selectivity should not be greater nor less, in the hydrogenation zone, than about 2.4 mol %. It is usually not practicable to maintain olefin conversions in the aldehyde stage substantially greater than about 80%.

These critical conditions may be obtained and maintained in the following manner:

By way of illustration, a plant control method utilizing the principles outlined above is the operation of the hydrogenation section responsive to the change in specific or A. P. I. gravity. The difference in gravity between pure iso-octyl aldehyde and pure iso-octyl alcohol is very small, but the difference between the alcohol and C$_8$ hydrocarbon is large; the change in A. P. I. gravity is approximately proportional to the amount of hydrocarbon formed during hydrogenation. Thus, with C$_7$ polymer olefin converted to iso-octyl aldehyde to the extent of 70–80 mol %, the increase in gravity should never be allowed to exceed 3 units A. P. I., and preferably be about 2 units.

The figure shows clearly the dependency of the iso-octyl alcohol selectivity upon the selectivity to octane. The curves, derived from a large number of runs made in a semi-commercial 215 B/D plant, show that for slight increases or decreases in octane content from the critical level, the alcohol product drops precipitously. Thus, when an aldehyde product resulting from a 79–81% heptene conversion level operation is hydrogenated under conditions such that the octane content of the product is 2.4 mol %, an alcohol yield of over 67% is realized. Under conditions such that the octane content drops to 2.0%, the alcohol yield drops sharply to 65%. The same lower alcohol yield is also realized when the octane yield increases to 2.8%. Comparable results are obtained at lower heptene conversion levels in the aldehyde stage.

The data upon which the figure is based was obtained from a large number of plant runs operated as follows:

*Aldehyde synthesis stage.*—C$_7$ olefin derived from the polymerization of a refinery mixed propylene-butylene stream over a solid P$_2$O$_5$-kieselguhr catalyst was treated with 2.5–3% cobalt oleate in the presence of equal volumes H$_2$ and CO to give olefin conversions in the range of 74–81%. The data were segregated into two groups representative of 74–76% and 79–81% conversion respectively. The operation was carried out at a nominal feed rate of 200 B./D.

*Hydrogenation stage.*—Operated at 210–215 B./D. at an average temperature of 485°–510° F. with a molybdenum sulfide catalyst supported on activated carbon. Water was injected into the hydrogenation zone at a rate of 9–10% on the feed. Distillation was carried out in laboratory equipment in a 25 mm. Podbielniak column operated at 5/1 reflux ratio. Alcohol yield is expressed as weight percent on hydrogenated product and the octane is expressed as mol percent on a heptane-free basis.

What is claimed is:

1. In a carbonylation process wherein olefinic compounds, CO and H$_2$ are contacted at elevated temperatures and pressures with a cobalt catalyst in an initial reaction zone under conditions including temperatures of 150° to 450° F. and pressures of 100 to 300 atmospheres to form an aldehyde product containing at least one more carbon atom than said olefinic compounds, and wherein said aldehyde product is further reacted in a hydrogenation zone at elevated temperatures and pressures from about 2000 to 4000 p. s. i. g. to form a crude alcohol product, the improvement which comprises maintaining a molybdenum sulfide hydrogenation catalyst supported on activated carbon in said hydrogenation zone, adding extraneous water to said zone, maintaining an olefin conversion level of from about 74 to about 81% in said initial zone, further forming about 1 to 3 mol percent of a saturated hydrocarbon having the same number of carbon atoms as said alcohol product, and withdrawing said crude alcohol product containing said hydrocarbon.

2. The process of claim 1 wherein said olefin is a heptene fraction and said hydrocarbon is an octane.

3. The process of claim 1 wherein the hydrogenation conditions comprise temperatures of about 480° to 520° F. and pressures of about 2500–3500 p. s. i. g.

4. The process of claim 2 wherein the olefin conversion level within said aldehyde synthesis zone is maintained at about 74–76% and the octane content of said alcohol product about 1 to 2 mol percent.

5. In a carbonylation process wherein a heptene fraction, CO and H$_2$ are contacted at elevated temperatures and pressures with a cobalt catalyst in an initial reaction zone under conditions including temperatures of 150 to 450° F. and pressures of 100 to 300 atmospheres to form an iso-octyl aldehyde product and wherein said aldehyde product is further reacted in a hydrogenation zone at elevated temperatures and pressures from about 2000 to 4000 p. s. i. g. to form an iso-octyl alcohol product, the improvement which comprises maintaining a molybdenum sulfide hydrogenation catalyst supported on activated carbon in said hydrogenation zone, adding extraneous water to said zone, maintaining an olefin conversion level of from about 79 to 81% in said initial zone, further converting about 2 to 3 mol percent of said alcohol to an octane and withdrawing said iso-alcohol product containing said octane.

References Cited in the file of this patent

UNITED STATES PATENTS

| | | |
|---|---|---|
| 2,455,713 | Voorhies | Dec. 7, 1948 |
| 2,471,914 | Sweetser | May 31, 1949 |
| 2,500,210 | Schexnailder, Jr. | Mar. 14, 1950 |
| 2,509,878 | Owen | May 30, 1950 |
| 2,544,271 | Liedholm et al. | Mar. 6, 1951 |
| 2,557,701 | Smith | June 19, 1951 |
| 2,594,341 | Owen et al. | Apr. 29, 1952 |
| 2,595,096 | Parker | Apr. 29, 1952 |

OTHER REFERENCES

German Patent Application I 72,947 IVd/120 O. Z. 13,597. T. O. M. Reel 36, Item 21 and part of Item 36. Deposited in the Library of Congress March 12, 1946. Also available in "Oxo Process" published by Charles A. Meyer Co., pages 45 and 46.

Fiat Final Report No. 1000 (PB-81383), pgs. 31-32 (December 26, 1947).